May 14, 1940.　　　　J. M. ROPER　　　　2,200,300

REFLECTION ELIMINATION DEVICE

Filed Aug. 4, 1937

INVENTOR
JOHN M. ROPER
BY
ATTORNEY

Patented May 14, 1940

2,200,300

UNITED STATES PATENT OFFICE 2,200,300

REFLECTION ELIMINATION DEVICE

John M. Roper, Washington, D. C.

Application August 4, 1937, Serial No. 157,377

1 Claim. (Cl. 88—65)

(Granted under the act of March 3, 1883, as amended April 30, 1928; 370 O. G. 757)

This invention relates to a reflection elimination device and has for an object to provide means of eliminating reflections of lighted objects from nearby reflecting surfaces. The invention has particular application for use in airplanes and it is likewise usable in analogous positions in other vehicles such as boats, automobiles, locomotives and the like.

In operating an airplane the pilot must continually observe the instruments as well as his path of travel. At night it is necessary that the instruments be lighted in order that they may be visible. The windshield protecting the pilot necessarily acts to reflect images of the lighted instruments under ordinary conditions, making it difficult for the pilot to observe landmarks and other objects through the windshield and seriously increasing the hazard of operation. Pilots often find it necessary to extinguish the lights on the instrument board in order to properly observe the landmarks. This, of course, has the hazard in that the pilot does not have the information of the instruments available simultaneously as it is necessary.

The use of polarized eye glasses has been suggested in order to eliminate the glare of the image reflections in the windshield but such glasses have the undesirable effect of likewise diminishing the amount of light that may reach the pilot's eyes, thereby diminishing his vision in all directions. With this invention it becomes possible to eliminate the reflections of the lighted instruments in the windshield so that the pilot may have full use of his lighted instruments and simultaneously have full use of his vision in observing landmarks through the windshield, and this is accomplished by lighting the instrument by indirect lighting and placing a polarizing medium only between the lighted surface of the instrument and the observer so that only the reflected light from the instrument passes through the polaroid.

With the foregoing and other objects in view, as will hereinafter become apparent, this invention comprises the combinations, constructions and arrangements of parts hereinafter set forth and illustrated on the accompanying drawing wherein.

Figures 1, 2:
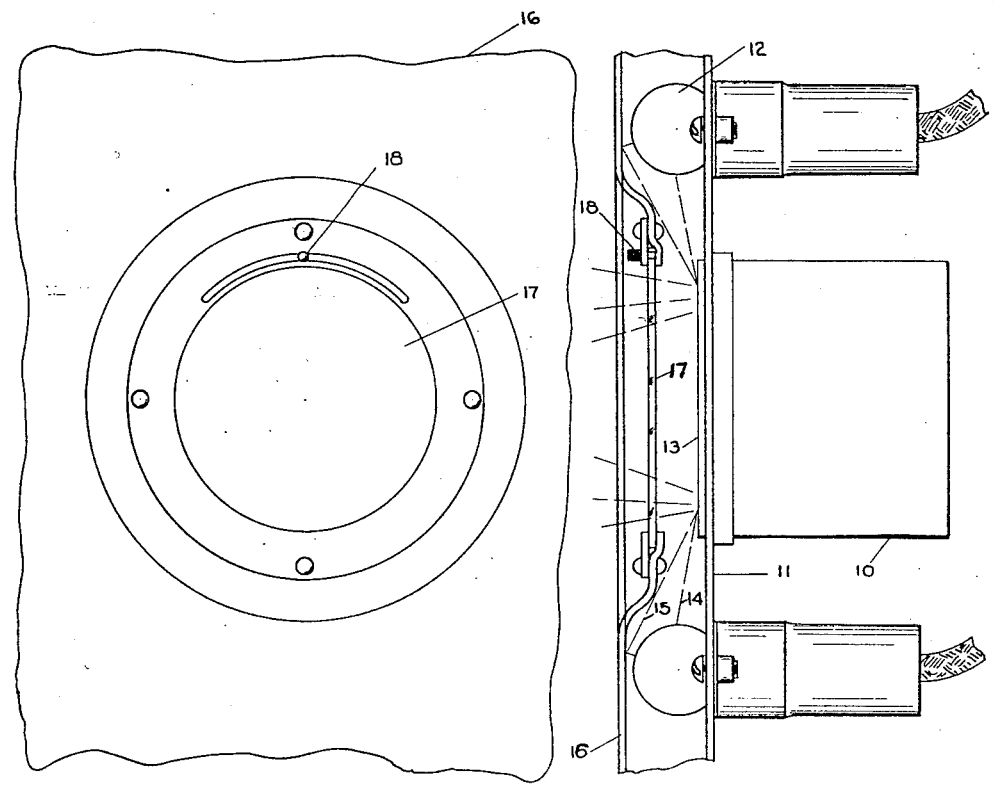
Fig. 1 is a fragmentary plan view of an instrument board to which this invention has been applied.
Fig. 2 is a side view of Fig. 1.
Figure 3:
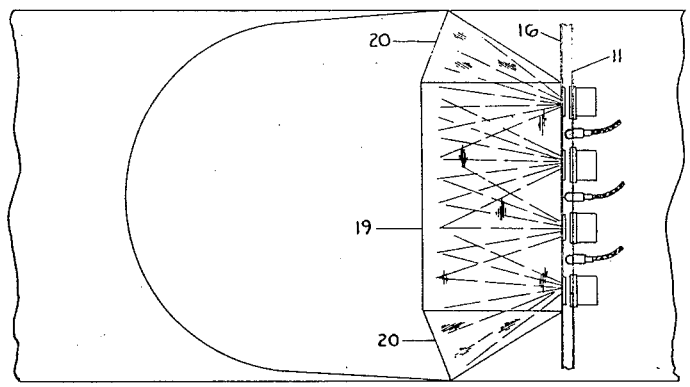

Fig. 3 is a top plan schematic view of an airplane cockpit showing the windshield and instrument board to which this invention has been applied. There is shown at 10 a vehicle instrument on an instrument board 11 on which is also mounted a lighting means 12 for lighting the face of the instrument, as will be observed in Fig. 2. Rays from the lighting means 12 may reach the face 13 of the instrument both directly as at 14 and indirectly as at 15 when reflected from the inside of the instrument shield 16. This instrument shield 16 also serves as a mounting means for a polarizing screen 17, the polarizing screen 17 being rotatably adjustable as at 18 over the face 13 of the instrument 10. The plane polarized light emitted by the polarizing screen 17 will be reflected back into the cockpit, or refracted outwardly through the windshield and consequently rendered invisible to the observer, in a proportion depending upon the nearness of approach to a right-angle-relation between the plane of polarization of screen 17 and the plane of polarization by reflection of the windshield. Screen 17 is rotatably mounted in supporting shield 16, providing means to adjust said screen to the most effective angle with respect to the planes of the windshields to eliminate annoying reflections.

In operation, the polarizing screen 17, when rotatably adjusted, will at least in one position eliminate any reflections of the face 13 of the instrument 10 in the windshields 19 and 20. Sufficient illumination so as to make the faces of the instruments distinctly visible to the operator will reach his eyes at all times, yet due to the polarization of such light no reflected images of the instruments will appear in the windshields thereby avoiding any interference with the vision of the operator through the windshield and avoiding interfering with maximum efficiency. It will be further noted that the operator sees his instruments by polarized light only but that he sees all other objects by normal vision undisturbed by the presence of reflections in the windshields. Safety of operation of an airplane is thereby greatly enhanced.

The invention described herein may be manufactured and used by or for the Government of the United States of America for governmental purposes without the payment of any royalties thereon or therefor.

I claim:

Means for preventing reflected images of an instrument face lighted with unpolarized artificial light from being visible in the windshield of a vehicle to the operator of the vehicle, the light source being invisible to the operator, said reflecting images preventing means comprising a polarizing screen, said screen providing a window in parallel relation to the instrument face, the light rays from the light source reaching the instrument face without passing through said polarizing screen window, said polarizing screen window being mounted for rotation in the plane thereof parallel to the instrument face, the vehicle windshield being at an analyzing angular relation to the polarizing screen window and th instrument face, and means under the control c the operator for rotating said polarizing scree window to the optimum position.

JOHN M. ROPER.